UNITED STATES PATENT OFFICE.

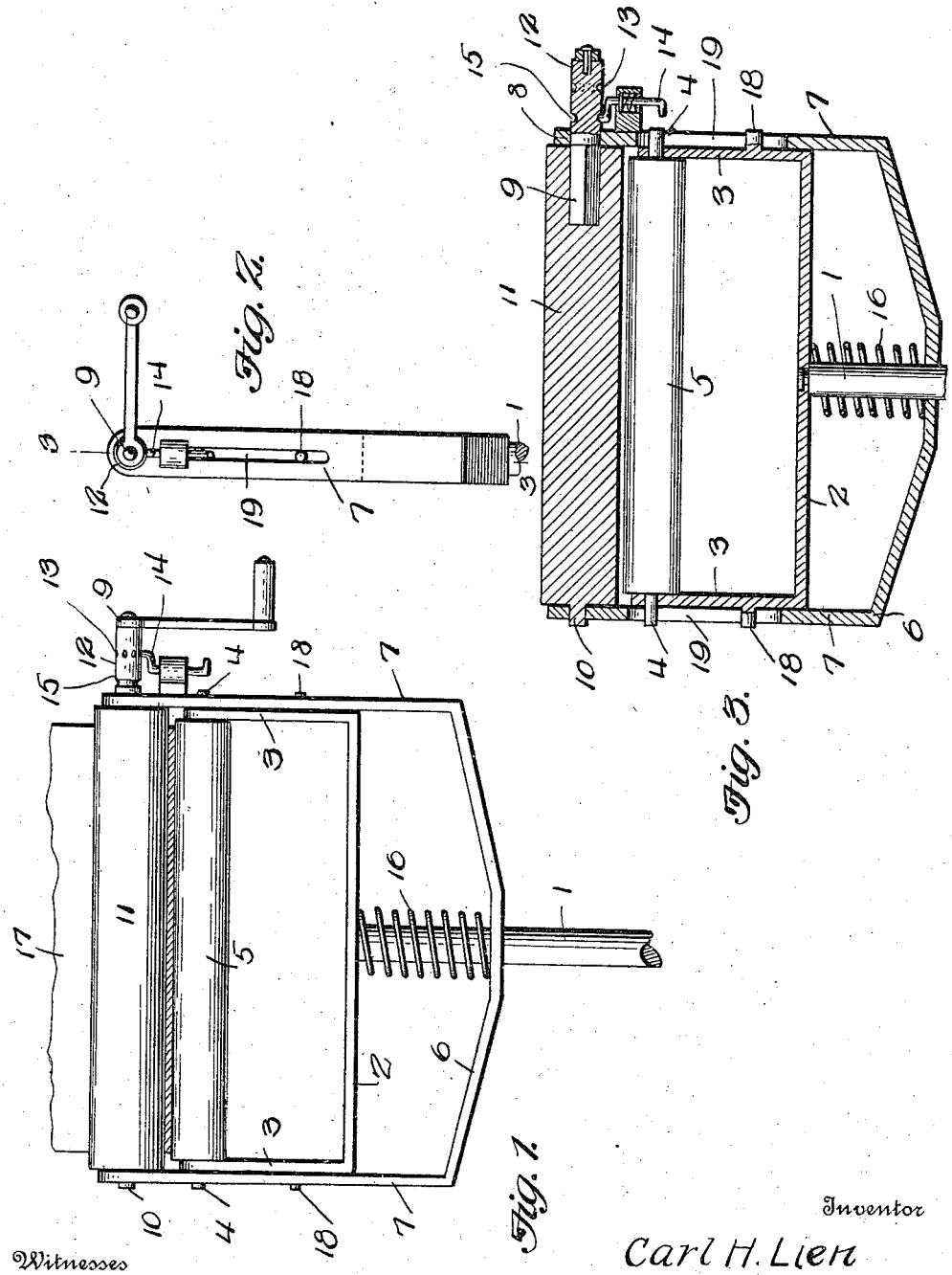

CARL H. LIEN, OF COLUMBUS, NORTH DAKOTA, ASSIGNOR OF ONE-HALF TO GILBERT J. COUGHLIN, OF COLUMBUS, NORTH DAKOTA.

MOP HEAD AND WRINGER.

965,472.        Specification of Letters Patent.     Patented July 26, 1910.

Application filed April 16, 1910. Serial No. 555,767.

*To all whom it may concern:*

Be it known that I, CARL H. LIEN, a citizen of the United States of America, residing at Columbus, in the county of Ward and State of North Dakota, have invented new and useful Improvements in Mop Heads and Wringers, of which the following is a specification.

This invention relates to mop heads and wringers, and an object of the invention is to provide a novel device of this character which is located at one end of the handle and designed to receive the mop cloth and to hold it securely between a pair of relatively movable wringing rollers which are so constructed that they may be operated to wring the cloth obviating the necessity of causing the hands of the operator to be brought into direct contact therewith and thus greatly facilitating the labor at this end.

In the drawing, forming a portion of this specification and in which like numerals of reference indicate similar parts in the several views:—Figure 1 is a front elevation of my improved mop head and wringer. Fig. 2 is an end view thereof. Fig. 3 is a detail section taken on the line 3—3 of Fig. 2.

My improved mop head and wringer consists of a handle 1 on which is mounted a head member 2 whose end portions are formed to provide brackets 3 in which the trunnions 4 of a wringing roller 5 are journaled. An auxiliary head member 6 is slidably mounted on the handle and it is formed to provide brackets 7 which are disposed outwardly of the brackets 3. The brackets 7 have their extremities extended beyond the extremities of the brackets 3, and as illustrated, these brackets are formed to provide perforations 8 for the reception of the crank handle 9 and trunnion 10 respectively of the roller 11. The roller is provided with a squared socket for receiving the correspondingly formed portion 12 of the crank handle. The portion 12 of the crank handle is extended beyond one of the brackets 7 and formed therein with a series of notches 13 for receiving a spring tension sliding dog 14.

The dog 14 is designed to engage either of the notches for two purposes, first, as a means of holding the crank handle operatively engaged with the roller and as means for preventing rotation of the roller during the mopping operation. The dog 14 is mounted so that it can be manually rotated and moved into engagement with an annular groove 15 in the portion 12 of the crank handle. This construction is such that when it is desired to wring the cloth the dog can be moved into the groove 15 and the crank handle revolved to permit the cloth to be fed between the rollers as will be understood. In order that the rollers will be revolved in opposite directions simultaneously I provide a helical spring 16 which is confined between the head members 2 and 6, the said spring being designed to exert its tension against the head member 6 so as to tend normally to move the roller 11 into frictional contact with its companion roller 5. The cloth 17 is of belt form. Incident to the peculiar construction of the crank handle and the engagement therewith of the hereinbefore described locking dog the latter can be disengaged from the former to permit the operator to entirely remove the crank handle from the roller so as to permit adjustment of the latter between the brackets 7 to facilitate the insertion or removal of the mop cloth.

The brackets 3 are provided with guide pins 18 which extend through longitudinal guide slots 19 in the brackets 7. The arrangement of the head member 6 on the handle is such that it can be moved conveniently against the tension of the spring 16 during the insertion or removal of the cloth.

I claim:—

1. A combined mop head and wringer comprising revolubly mounted rollers mounted for relative movement toward or away from each other, a crank handle removably engaged with one of the rollers, supports for the rollers, and means operable to engage the crank handle to hold the same against rotary movement.

2. A combined mop head and wringer comprising companion relatively movable head members, rollers supported by the said head members, a spring confined between the head members and exerting its tension thereagainst to hold the rollers yieldingly engaged with each other, a crank handle removably engaged with one of the rollers and supported by one of the head members, and means for engaging the crank handle to hold the same operatively associated with the roller and to hold the roller against rotation.

3. A combined mop head and wringer comprising relatively movable head members, a handle supporting the said members, rollers supported by the head members, a crank handle supported by one of the head members and removably engaged with one of the rollers, a locking dog operable to engage the crank handle to hold the same against rotary movement, and means on the crank handle adapted to be engaged by the locking dog to permit rotation of the said handle.

4. A combined mop head and wringer comprising a handle, a head member fixed to one end of the handle, a movable head member slidably mounted on the handle and on the fixed head member, a spring exerting its tension between the said head members, a roller supported by the fixed head member, a roller supported by the movable head member, and a crank handle removably supported by the said movable head member and removably engaged with the roller of such head member.

In testimony whereof I affix my signature in presence of two witnesses.

CARL H. LIEN.

Witnesses:
OLE I. RONNING,
GILBERT J. COUGHLIN.